United States Patent
Sonu

(10) Patent No.: US 6,581,181 B1
(45) Date of Patent: Jun. 17, 2003

(54) DOMINANT ERROR CORRECTION CIRCUITRY FOR A VITERBI DETECTOR

(75) Inventor: Gene Sonu, San Jose, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/538,134

(22) Filed: Mar. 29, 2000

(51) Int. Cl.[7] .......................... H03M 13/03; H03D 1/00
(52) U.S. Cl. ....................................... 714/795; 375/262
(58) Field of Search ................................. 714/795, 796, 714/794; 360/65; 375/262

(56) References Cited

U.S. PATENT DOCUMENTS

| | | | | |
|---|---|---|---|---|
| 5,552,942 A | * | 9/1996 | Ziperovich et al. | 360/51 |
| 5,781,590 A | * | 7/1998 | Shiokawa et al. | 375/341 |
| 5,844,741 A | * | 12/1998 | Yamakawa et al. | 360/65 |
| 5,938,790 A | * | 8/1999 | Marrow | 714/795 |
| 6,002,538 A | * | 12/1999 | Kanegae et al. | 360/46 |
| 6,111,835 A | * | 8/2000 | Honma | 369/59.13 |
| 6,154,870 A | * | 11/2000 | Fredrickson et al. | 714/786 |
| 6,345,074 B1 | * | 2/2002 | Turk et al. | 375/341 |

* cited by examiner

*Primary Examiner*—David Ton
*Assistant Examiner*—Esaw Abraham
(74) *Attorney, Agent, or Firm*—Pennie & Edmonds LLP

(57) ABSTRACT

The apparatus corrects a data detection error caused by baseline wandering in an optical PRML read channel. The apparatus includes error detection circuitry and error correction circuitry. The error detection circuitry monitors a serial output signal from the optical PRML read channel and a first set of input signals to the optical PRML read channel to detect an error event associated with baseline wandering. The error detection circuitry deems the error event to have occurred when three conditions are satisfied. First, a bit sequence represented by the serial output signal matches a first bit sequence associated with the error event. Second, a first difference in a first set of consecutive values represented by the first set of input signals is within a first range of values associated with the error event. Third, a second difference in a second set of consecutive values of the first input signal is within a second range of values associated with the error event. The error detection circuitry responds to satisfaction of all three conditions by asserting an error signal. The error correction circuitry responds to assertion of the error signal by modifying a pair of consecutive bits represented by the serial output signal to generate a corrected output signal having a second bit sequence.

17 Claims, 13 Drawing Sheets

DOMINANT ERROR CORRECTION CIRCUITRY FOR A VITERBI DETECTOR

BRIEF DESCRIPTION

The present invention relates generally to data detection in an optical Partial Response Maximum Likelihood (PRML) read channel, and particularly to error correction circuitry for improving data detection by correcting errors due to a dominant error event in an optical PRML read channel.

BACKGROUND

DVD, an acronym for Digital Video Disc or Digital Versatile Disc, is a relatively new type of Compact-Disc Read-Only-Memory (CD-ROM) with a minimum capacity of approximately 4.7 gigabytes. FIG. 1 illustrates in block diagram form apparatus for recording to and reading data from DVD 22. Recording Unit 20 takes digital data $m_k$ and records it on DVD 20. (The subscript "k" is used throughout to indicate generally a time-variant signal and the subscript "kn" indicates the value of a time-variant signal at a time k+n.) DVD player 24 includes Optical Pick-up Unit (OPU) 26, and an optical Partial Response Maximum Likelihood (PRML) Read Channel (Read Channel) 30. OPU 26 converts information read from DVD 22 into an analog RF signal on line 27. Read Channel 30 takes this RF signal and generates a digital signal $q_k$. Read Channel 30 includes Automatic Gain Control (AGC) & Equalization Circuitry 32, Analog-to-Digital Converter (ADC) 34 and Viterbi Decoder 36. AGC & Equalization Circuitry 32 filters and limits the voltage magnitude of the RF signal on line 27, producing the analog signal on line 33. ADC 34 samples the analog signal on line 33 and produces a multi-bit digital signal, $y_k$, on line 35 that represents the magnitude of the analog signal on line 33. Viterbi Decoder 36 analyzes the $y_k$ signal over several sample values and determines the most likely value represented by each sample. Viterbi Decoder 36 represents the most likely values via its output signal, $q_k$, on line 40, which is a single bit in a Non-Return to Zero Inverted (NRZI) format. Ideally, $q_k$ should be identical to $m_k$; however, errors prevents this.

Much of the error in $q_k$ is caused by baseline wandering. As used herein, baseline wandering refers to low frequency disturbances of a radio frequency signal. FIG. 2A illustrates an ideal input signal to ADC 34, which is free from baseline wandering. The signal graphed in FIG. 2A remains centered about a baseline, zero volts in this example, throughout the illustrated time period. FIG. 2B illustrates a second input signal to ADC 34, which is subject to baseline wandering. The illustrated input signal has no fixed baseline; i.e., it exhibits a variable DC offset. The variable DC offset of the radio frequency signal produces a time variable error in $y_k$, the output of ADC 34. FIG. 3A is a histogram of the $y_k$ signal given an input signal to ADC 34 that is free from baseline wandering; i.e., given the signal of FIG. 2A. In the absence of baseline wandering, the histogram of the $y_k$ signal represents five distinctive sample values, 1, $\frac{2}{3}$, 0, $-\frac{2}{3}$ and $-1$. Baseline wandering of the signal to be sampled by ADC 34 produces a quite different histogram. FIG. 3B is a histogram of the $y_k$ signal given the input signal of FIG. 2B. FIG. 3B indicates that ADC 34 does not produce distinct sample values in the presence of baseline wandering, producing instead every sample value between approximately $-1.25$ to $1.25$. FIG. 3C through FIG. 3G are individual histograms for each ideal sample value. Thus, FIG. 3C is a histogram of sample values corresponding the ideal value of 1; FIG. 3D is a histogram of sample values corresponding to the ideal value of $\frac{2}{3}$; FIG. 3E is a histogram of sample values corresponding to the ideal value of 0; FIG. 3F is a histogram of sample values corresponding to the ideal value of $-\frac{2}{3}$; and FIG. 3G is a histogram of sample values corresponding to the ideal value of $-1$. These histograms reveal that baseline wandering destroys the one to one correspondence between ideal sample values and the values output by ADC 34. For example, FIGS. 3C and 3D indicate that a $y_k$ value of $+\frac{3}{4}$ may be due to either an ideal sample value of either 1 or $\frac{2}{3}$. Thus, a need exists for circuitry to correct data detection errors caused by baseline wandering.

SUMMARY

The apparatus of the present invention corrects a data detection error caused by baseline wandering in an optical PRML read channel. The apparatus includes error detection circuitry and error correction circuitry. The error detection circuitry monitors a serial output signal from the optical PRML read channel and a first set of input signals to the optical PRML read channel to detect an error event associated with baseline wandering. The error detection circuitry deems an error event to have occurred when three conditions are satisfied. First, a bit sequence represented by the serial output signal matches a first bit sequence associated with the error event. Second, a first difference in a first set of consecutive values represented by the first set of input signals is within a first range of values associated with the error event. Third, a second difference in a second set of consecutive values of the first input signal is within a second range of values associated with the error event. The error detection circuitry responds to satisfaction of all three conditions by asserting an error signal. The error correction circuitry responds to assertion of the error signal by modifying a pair of consecutive bits represented by the serial output signal to generate a corrected output signal having a second bit sequence.

BRIEF DESCRIPTION OF THE DRAWINGS

Additional features of the invention will be more readily apparent from the following detailed description and appended claims when taken in conjunction with the drawings, in which:

DETAILED DESCRIPTION

Figure 1:
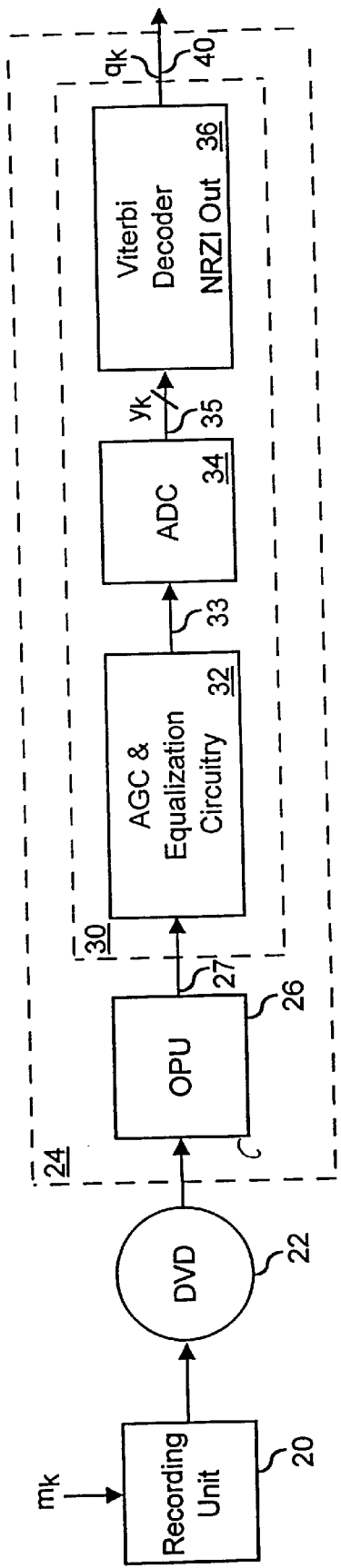
FIG. 1 illustrates prior art apparatus for recording to, and reading data from, a DVD.
Figure 2A:
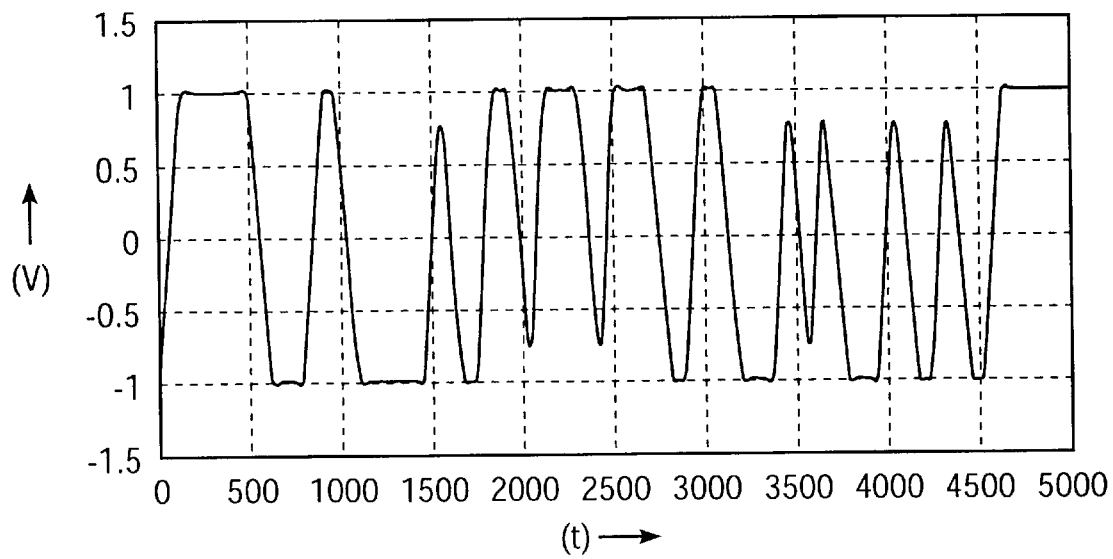
FIG. 2A illustrates an ideal input signal, free from baseline wandering, to the ADC of FIG. 1.
Figure 2B:
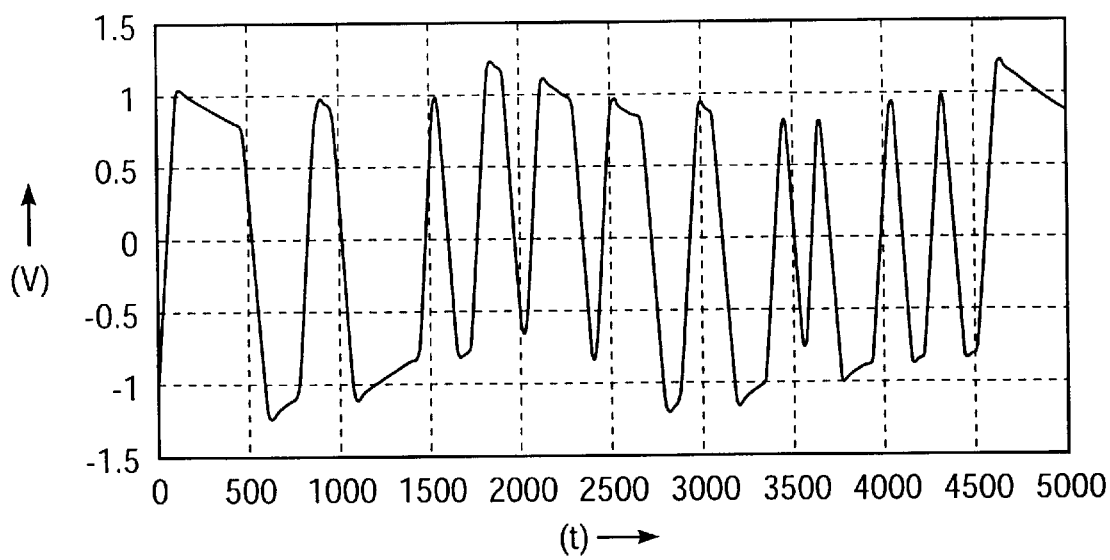
FIG. 2B illustrates a input signal to the ADC of FIG. 1, which is subject to baseline wandering.
Figure 3A:
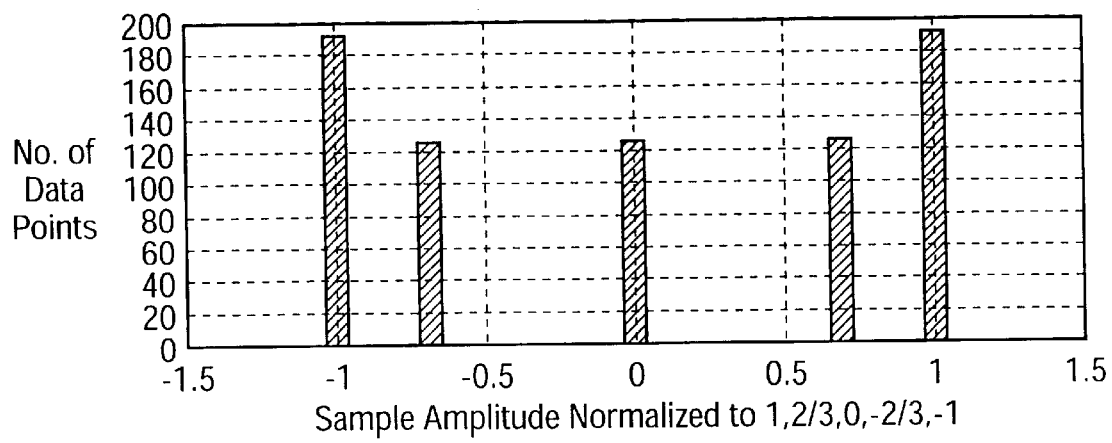
FIG. 3A is a histogram of the output signal from the ADC of FIG. 1 given an input signal that is free from baseline wandering.
Figure 3B:
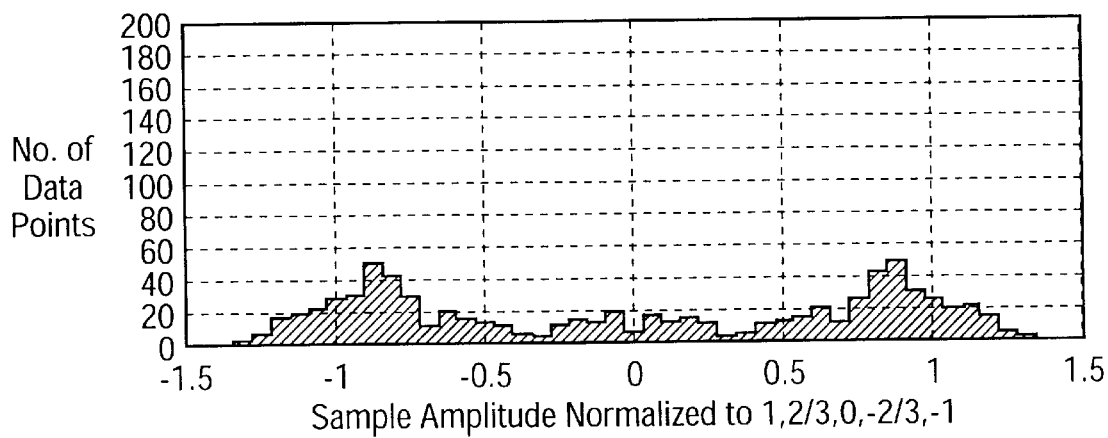
FIG. 3B is a histogram of the output signal from the ADC of FIG. 1 given the input signal of FIG. 2B.
Figure 3C:
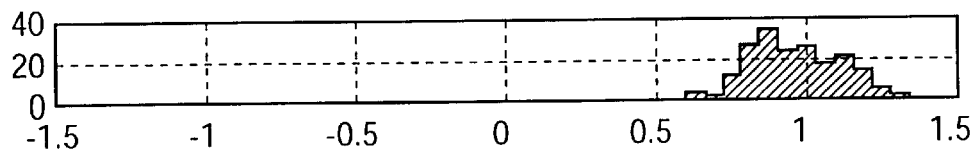
FIG. 3C is a histogram of sample values corresponding to the ideal value of 1.
Figure 3D:
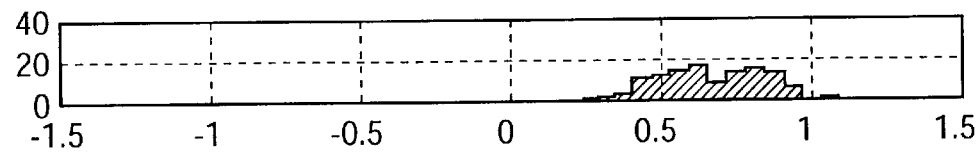
FIG. 3D is a histogram of sample values corresponding to the ideal value of $\frac{2}{3}$.
Figure 3E:
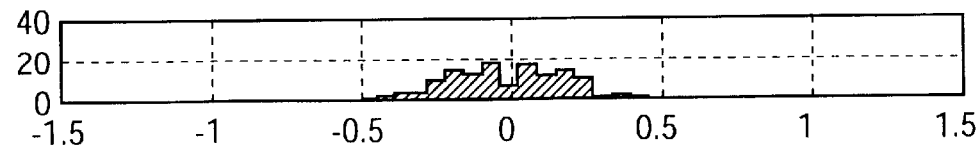
FIG. 3E is a histogram of sample values corresponding to the ideal value of 0.
Figure 3F:
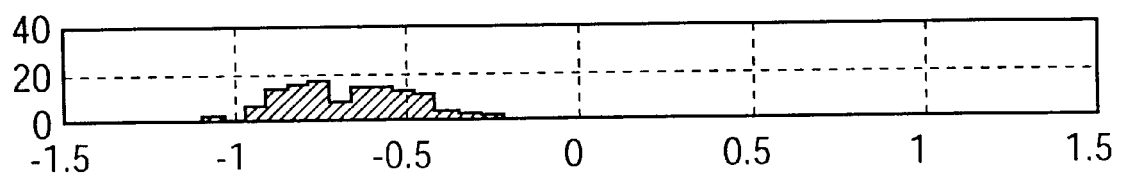
FIG. 3F is a histogram of sample values corresponding to the ideal value of $-\frac{2}{3}$.
Figure 3G:
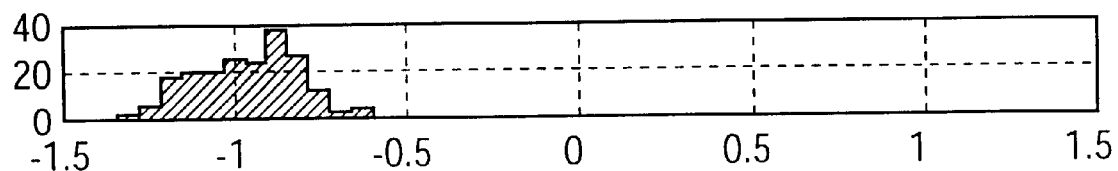
FIG. 3G is a histogram of sample values corresponding to the ideal value of $-1$.
Figure 4:
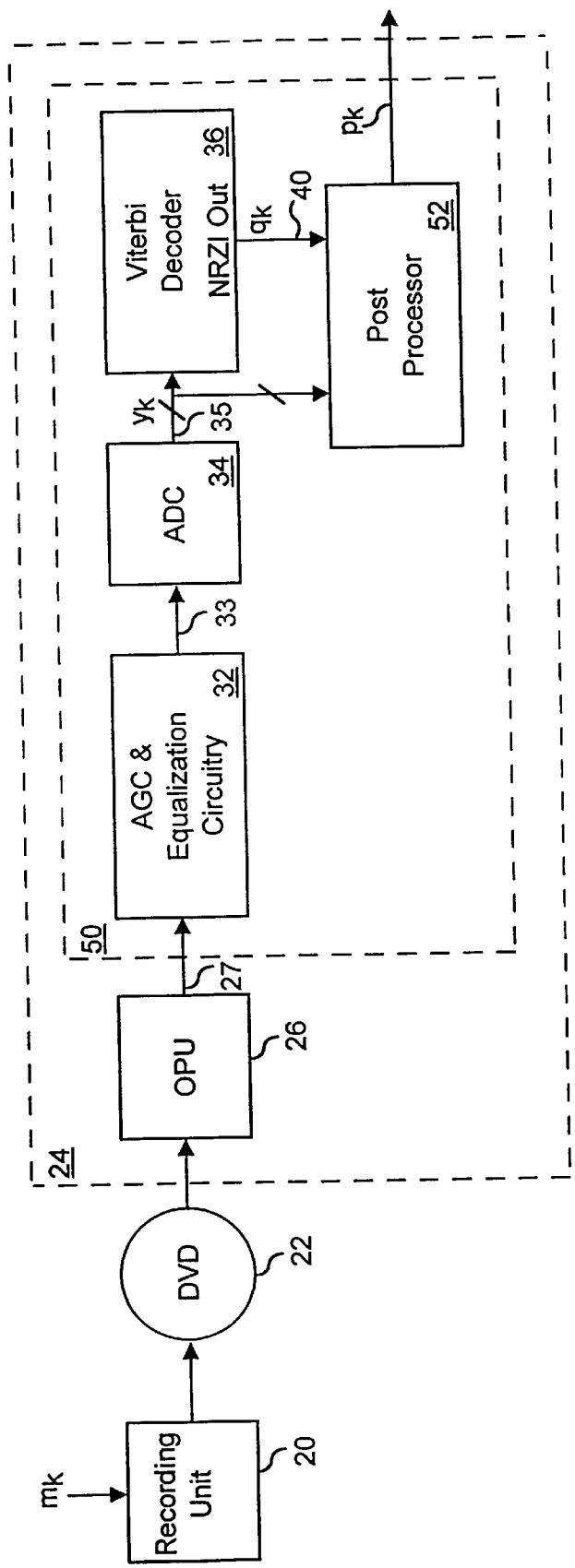
FIG. 4 illustrates an optical PRML Read Channel including the Post-Processor of the present invention.

FIG. 4 illustrates in block diagram form optical PRML Read Channel (Read Channel) 50, which includes Post-Processor 52 of the present invention. Post-Processor 52 improves data detection within Read Channel 50 by correcting errors in the $q_k$ signal that result from a dominant error event produced by baseline wandering. Briefly described, Post-Processor 52 first determines whether a bit sequence of the $q_k$ signal matches that associated with the dominant error event. Next, Post-Processor 52 compares difference sequences of the $y_k$ signal to difference sequences known to produce the dominant error event. Post-Processor 52 deems the error event to have occurred if the $q_k$ bit sequence matches that associated with the dominant error event and the associated difference sequences match those known to produce to the dominant error event. If the dominant error event has occurred, Post-Processor 52 corrects the $q_k$ signal to produce the corrected output signal, $p_k$.

A. The Dominant Error Event

Prior to a detailed discussion of Post-Processor 52, consider first the dominant error event within Read Channel 50. Produced by baseline wandering, the dominant error event causes a $m_k$ NRZI bit sequence of x000100100x$_b$ (the earliest bit occupies the far left position of the bit sequence) to be detected as a $q_k$ NRZI bit sequence of x001000100x$_b$. (Bolding in the $m_k$ and $q_k$ NRZI bit sequences indicates the location of the error event.) The dominant error event can be described in terms of states of Viterbi Decoder 36, which are defined by Non-Return to Zero (NRZ) format, rather than NRZI format. The dominant error event can be produced by either of two complementary cases:

(1) The transmitted NRZ bit stream is [0000111000$_b$], but is falsely detected as the NRZ bit stream of [0001111000$_b$]; and (2) The transmitted NRZ bit stream is [1111000111$_b$], but is falsely detected as the NRZ bit stream of [1110000111$_b$].

Figure 5:
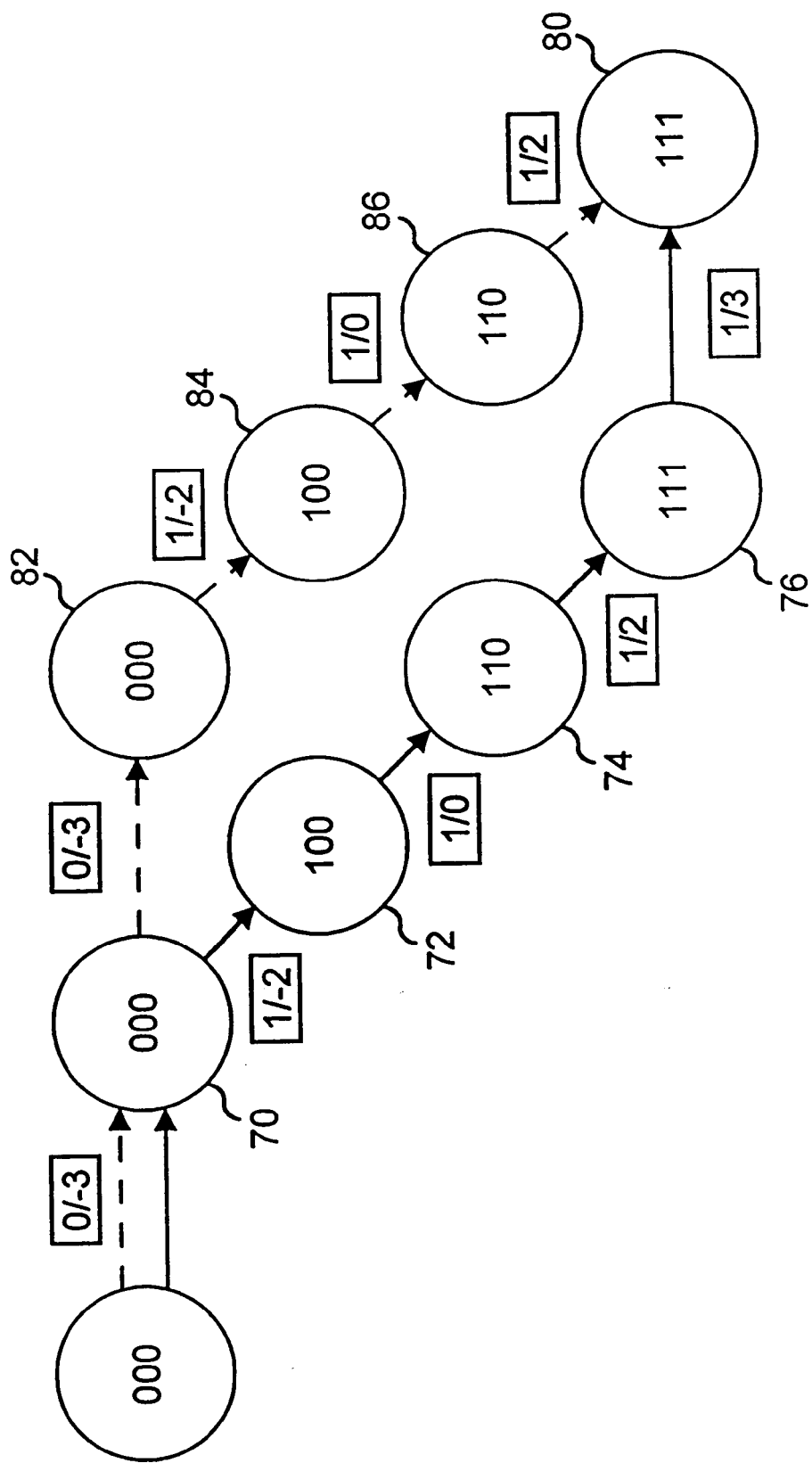
FIG. 5 illustrates trellis diagrams for when the ideal NRZ bit stream is [0000111000$_b$], but is falsely detected by the PRML read channel as [0001111000$_b$].
Figure 6:
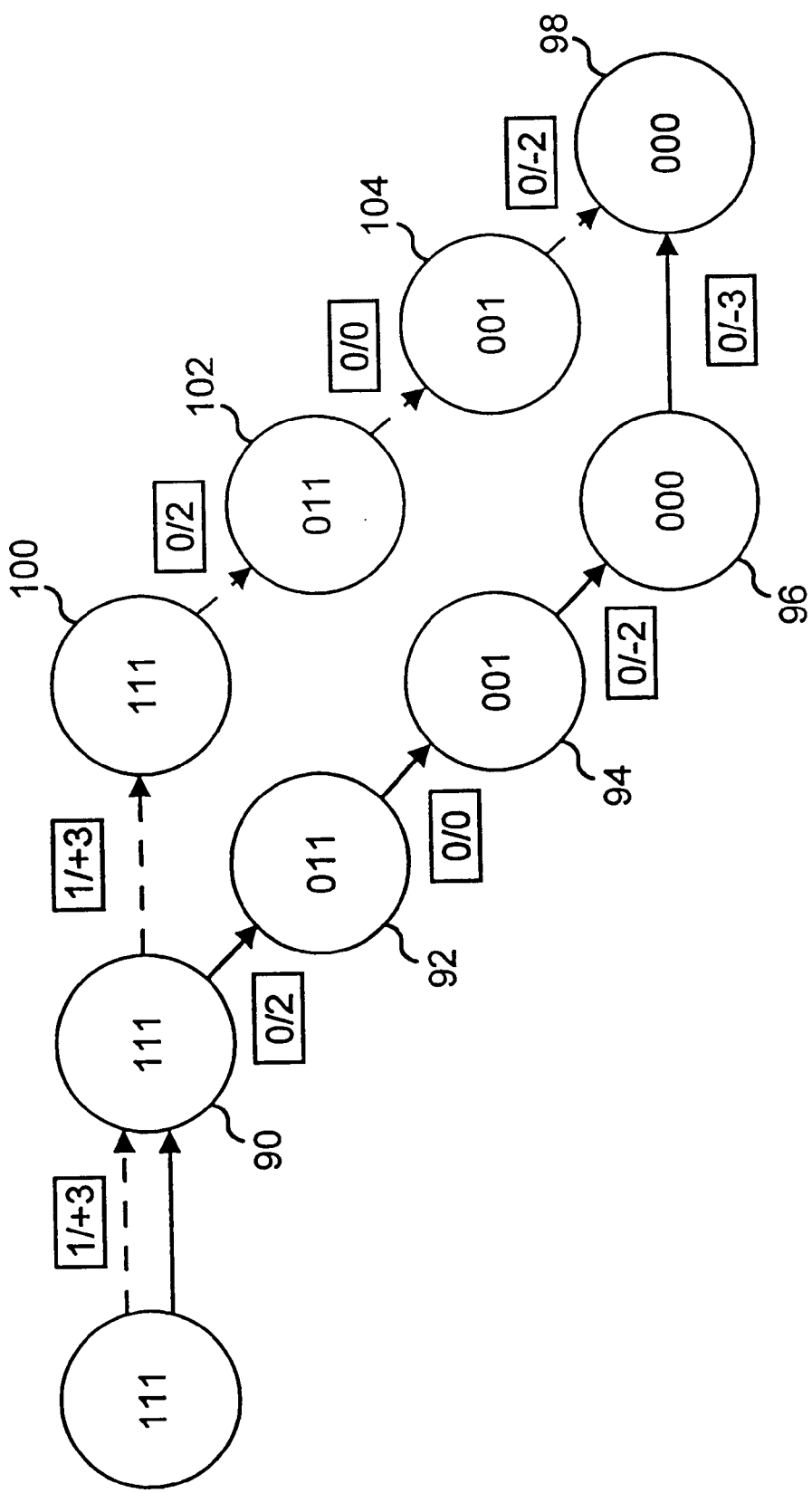
FIG. 6 illustrates trellis diagrams for when the ideal NRZ bit [1111000111$_b$] is falsely detected by the PRML read channel as [1110000111$_b$].

The trellis diagrams of FIGS. 5 and 6 illustrate the sequence of events leading to each of the two complementary cases. Each trellis diagram includes a number of linked circles, which represent Viterbi Decoder states. Each trellis diagram includes two sequences of states, the ideal sequence of states and the falsely detected sequence of states. The NRZ states of the ideal sequence are linked by dashed lines, while the NRZ states of the falsely detected sequence are linked by solid lines. The identity of each state is identified by a three bit number, $s_k$, within the state, which is defined as [$p_{k2}$, $p_{k1}$, $p_{k0}$]. Immediately to the right of each state is a box indicating the input, $p_k$, and the output, $y_k$, for the state. For all states $p_k$ is a member of {1,0} and $y_k$ is a member of {3, 2, 0, -2, 3} and is equal to $\frac{1}{2}p_{k3}+p_{k2}+p_{k1}+\frac{1}{2}p_{k0}$.

FIG. 5 illustrates trellis diagrams for Case 1: the ideal NRZ bit stream is [00001110000$_b$], but is falsely detected as [0001111000$_b$]. States 72–76 indicate the erroneous sequence of states, while States 82–86 indicate the ideal sequence of States. While in State 70, rather than generating a $p_k$ of 0, Viterbi Decoder 36 generates a $p_k$ of 1. This single instance of an erroneous value of $p_k$, subsequently causes Viterbi Detector 36 to branch through States 72–76. This sequence of States produces four erroneous values of [$y_{k3}$, $y_{k2}$, $y_{k1}$ $y_{k0}$] equal to [3, 2, 0, -2]. This sequence of states also produce a difference sequence [($y_{k3}-y_{k2}$), ($y_{k2}-y_{k1}$), ($y_{k1}-y_{k0}$)] equal to [1, 2, 2]. In contrast, the correct sequence of States 82–86 produces [$y_{k3}$, $y_{k2}$, $y_{k1}$, $y_{k0}$] equal to [2, 0, 2, -3] and a difference sequence [($y_{k3}-y_{k2}$), ($y_{k2}-y_{k1}$), ($y_{k2}-y_0$)] equal to [2, 2, 1].

FIG. 6 illustrates trellis diagrams for Case 2: The transmitted NRZ bit [1111000111$_b$] is falsely detected as [1110000111$_b$]. States 92–96 indicate the erroneous sequence of states, while States 100–104 indicate the ideal sequence. While in State 90, rather than generating a $p_k$ of 1, Viterbi Decoder 36 outputs a $p_k$ of 0. This single instance of an erroneous value of $p_k$, subsequently causes Viterbi Detector 36 to branch through States 92–96. This sequence of States produces [$y_{k3}$, $y_{k2}$, $y_{k1}$, $y_{k0}$] equal to [-3, -2, 0, 2] and a difference sequence [($y_{k3}-y_{k2}$), ($y_{k2}-y_{k1}$), ($y_{k1}-y_{k0}$)] equal to [-1, -2, -2]. In contrast, the correct sequence of States 100–104 produces [$y_{k3}$, $y_{k2}$, $y_{k1}$, $y_{k0}$] equal to [-2, 0, 2, 3] and a difference sequence [($y_{k3}-y_{k2}$), ($y_{k2}-y_{k1}$), ($y_{k1}-y_{k0}$)] equal to [-2, -2, -1].

Comparison of output and difference sequences for both the correct and erroneous sequences of States for Cases 1 and 2 reveals that their absolute values are the same. For example, the absolute values of the difference sequence for the erroneous sequence of States for Case 1 is [|1|, |2|, |2|] and the absolute values of the difference sequence for the erroneous sequence of States for Case 2 is [|-1|, |-2|, |-2|]. The absolute values of the difference sequences for the correct sequence of States for Cases 1 and 2 is [2, 2, 1]. Combining knowledge of the absolute values of difference sequences for the correct and incorrect sequence of States with knowledge of the sequence of input values associated with the dominant error event permits correction and detection of errors caused by the dominant error event. In particular, an error associated with the dominant error event may be detected by searching for a sequence of $p_k$ values of [10001$_b$] and determining whether the resulting input difference sequence [|$y_{k3}-y_{k2}$|, |$y_{k2}-y_{k1}$|, |$y_{k1}-y_{k0}$|] is closer to the absolute values for the correct difference sequence, [2, 2, 1], or the absolute values for the erroneous difference sequence, [1, 2, 2].

B. The Post-Processor

Figure 7:
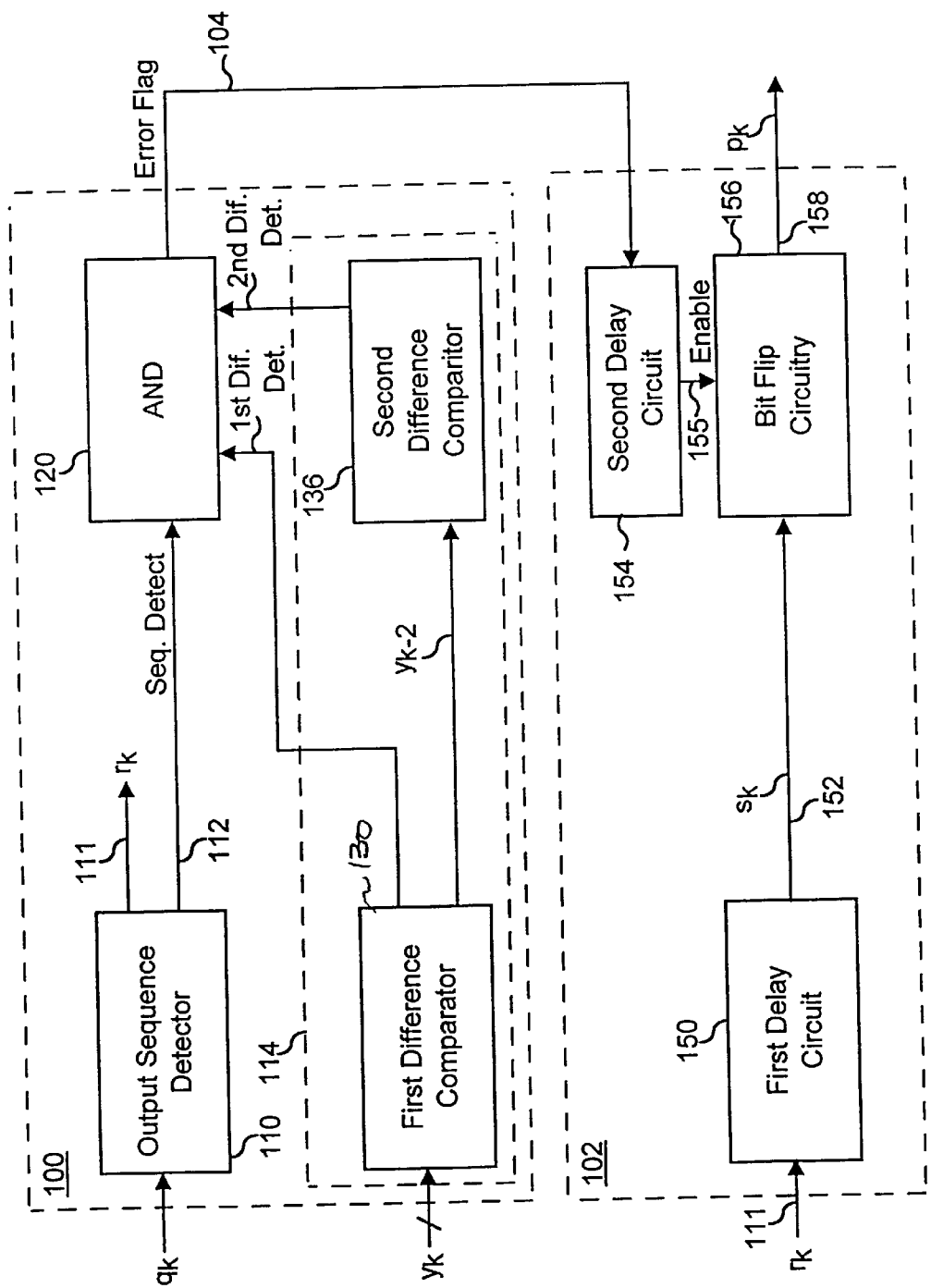
FIG. 7 illustrates an embodiment of the Post-Processor of FIG. 4.

FIG. 7 illustrates Post-Processor 52 in block diagram form. Post-Processor 52 includes Error Detection Circuitry 100 and Error Correction Circuitry 102. Error Detection Circuitry 100 examines the signals input to and output from Viterbi Decoder 36 to determine whether an error associated with the dominant error event has occurred. If so, Error Detection Circuitry 100 informs Error Correction Circuitry 102 by asserting the Error signal on line 104. Error Correction Circuitry 102 responds to assertion of the Error signal by replacing the erroneous sequence of bits of $q_k$ with the correct sequence of bits.

Error Detection Circuitry 100 includes Output Sequence Detector 110, Difference Sequence Comparator 114 and logical AND gate 120. Output Sequence Detector 110 examines the output from Viterbi Detector 36, the $q_k$ signal, to determine whether the current output sequence matches that associated with the dominant error event. In particular, Output Sequence Detector 110 determines whether $[q_{k4}, q_{k3}, q_{k2}, q_{k1}, q_{k0}]$ equals $[10001_b]$. If so, Output Sequence Detector 110 asserts the Sequence Detect signal on line 112. Difference Sequence Comparator 114 takes the input to Viterbi Decoder, the $y_k$ signal, and generates a difference sequence that it compares to the incorrect difference sequence. In particular, Difference Sequence Comparator 114 compares input difference sequence $[|y_{k3}-y_{k2}|, |y_{k2}-y_{k1}|, |y_{k1}-y_0|]$ to $[2, 2, 1]$. If the Difference Sequence Comparator 114 determines that the two sequences resemble one another, it asserts a First and a Second Difference Detect signal. These two signals, along with the Sequence Detect signal, are input to logical AND gate 120. When all three of its input signals are asserted, logical AND gate asserts the Error signal on line 104, indicating to Error Correction Circuitry 102 that a sequence of bits output by Viterbi Decoder 36 should be corrected. In particular, the Error signal indicates that an error occurred five clock cycles ago. This effects the design of Error Correction Circuitry 102.

Difference Sequence Comparator 114 includes First Difference Comparator 130 and Second Difference Comparator 136. First Difference Comparator 130 examines the $|y_{k3}-y_{k2}|$ term of the input difference sequence and compares it to a first range of values about the value associated with the dominant error event; i.e. 2. When $|y_{k3}-y_{k2}|$ is approximately 2, then First Difference Comparator 130 asserts the First Difference Detect signal. Second Difference Comparator 136 examines the $|y_{k0}-y_{k1}|$ term of the input difference sequence and compares it to a second range of values about the value associated with the dominant error event, 1. When $|y_{k1}-y_{k0}|$ is approximately 1, Second Difference Comparator 136 asserts the Second Difference Detect Signal. Difference Sequence Comparator 114 does not include circuitry for examining difference term $|y_{k2}-y_{k1}|$ because the same value is associated with both the correct and dominant error event difference sequences.

Error Correction Circuitry 102 includes First Delay Circuit 150, Second Delay Circuit 154 and Bit Flip Circuitry 156. First Delay Circuit 150 receives on line 111 the $r_k$ signal, a delayed version of $q_k$, which it further delays to generate the $s_k$ signal on line 152. Second Delay Circuit 154 receives the Error signal on line 104, which it further delays prior to coupling it to Bit Flip Circuitry 156. In response to the Delayed Error signal, Bit Flip Circuitry 156 flips those bits of the $s_k$ signal representing $q_{k0}$ and $q_{k1}$ to generate the corrected $p_k$ signal.

B1. The Output Sequence Detector

Figure 8:
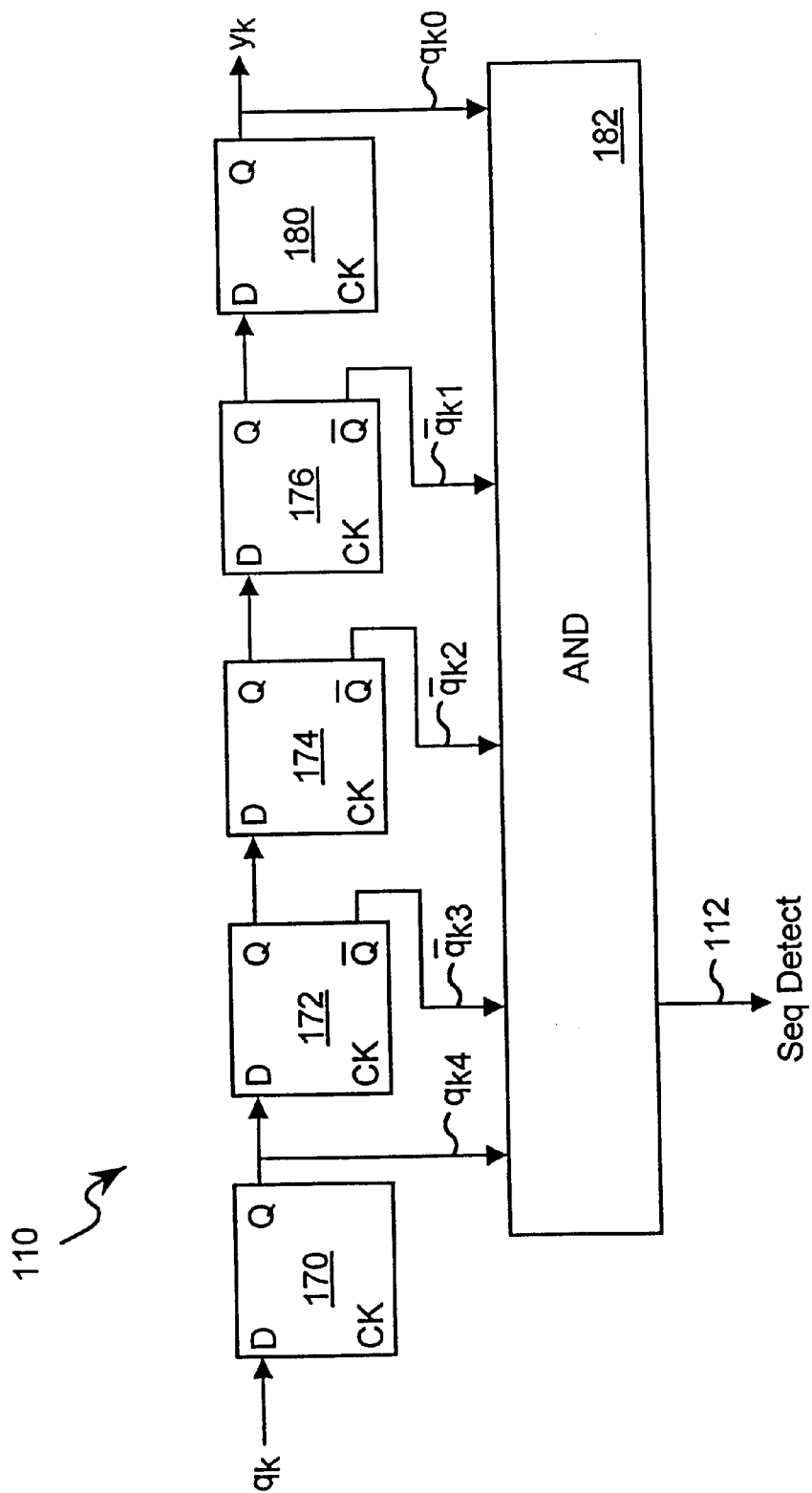
FIG. 8 illustrates an embodiment of the Output Sequence Detector of FIG. 7.

FIG. 8 illustrates, in block diagram form, Output Sequence Detector 110, which determines whether $[q_{k4}, q_{k3}, q_{k2}, q_{k1}, q_{k0}]$ matches the bit sequence associated with the dominant error event; i.e., $[11000_b]$. Output Sequence Detector 110 includes serially-coupled Latches 170, 172, 174, 176 & 180 and logical AND gate 182. The first of the serially-coupled Latches, Latch 170 has its D-input coupled to the NRZI output of Viterbi Decoder 36, the $q_k$ signal. The Q output of Latch 170 is used to route the value of $q_{k4}$ to logical AND gate 182. The Q output of Latch 170 is coupled to the D-input of Latch 172, whose Q Bar output is coupled to logical AND gate 182 to represent the inverse of $q_{k3}$. Latch 174 receives as its input the Q output of Latch 172. The Q Bar output of Latch 174 is coupled to logical AND gate 182 to represent the inverse of $q_{k2}$. The Q output of Latch 174 is coupled to the input of Latch 176, which couples its Q Bar output to logical AND gate 182 to represent the inverse of $q_{k1}$. Latch 180 receives its input from the Q output of Latch 176. The Q output of Latch 180 is coupled to logical AND gate 182 to represent $q_{k0}$ and is coupled to Error Correction Circuitry 102 as the $r_k$ signal. Logical AND gate 182 asserts its output, the Seq Detect signal on line 112, whenever each signal input to it is asserted; i.e. when $q_{k4}=1$, inverse($q_{k3}$)=1, inverse($q_{k2}$)=1, inverse($q_{k1}$)=1, and $q_{k0}=1$, which occurs only when $[q_{k4}, q_{k3}, q_{k2}, q_{k1}, q_{k0}]$ equals $[10001_b]$.

B2. The First Difference Comparator

Figure 9:
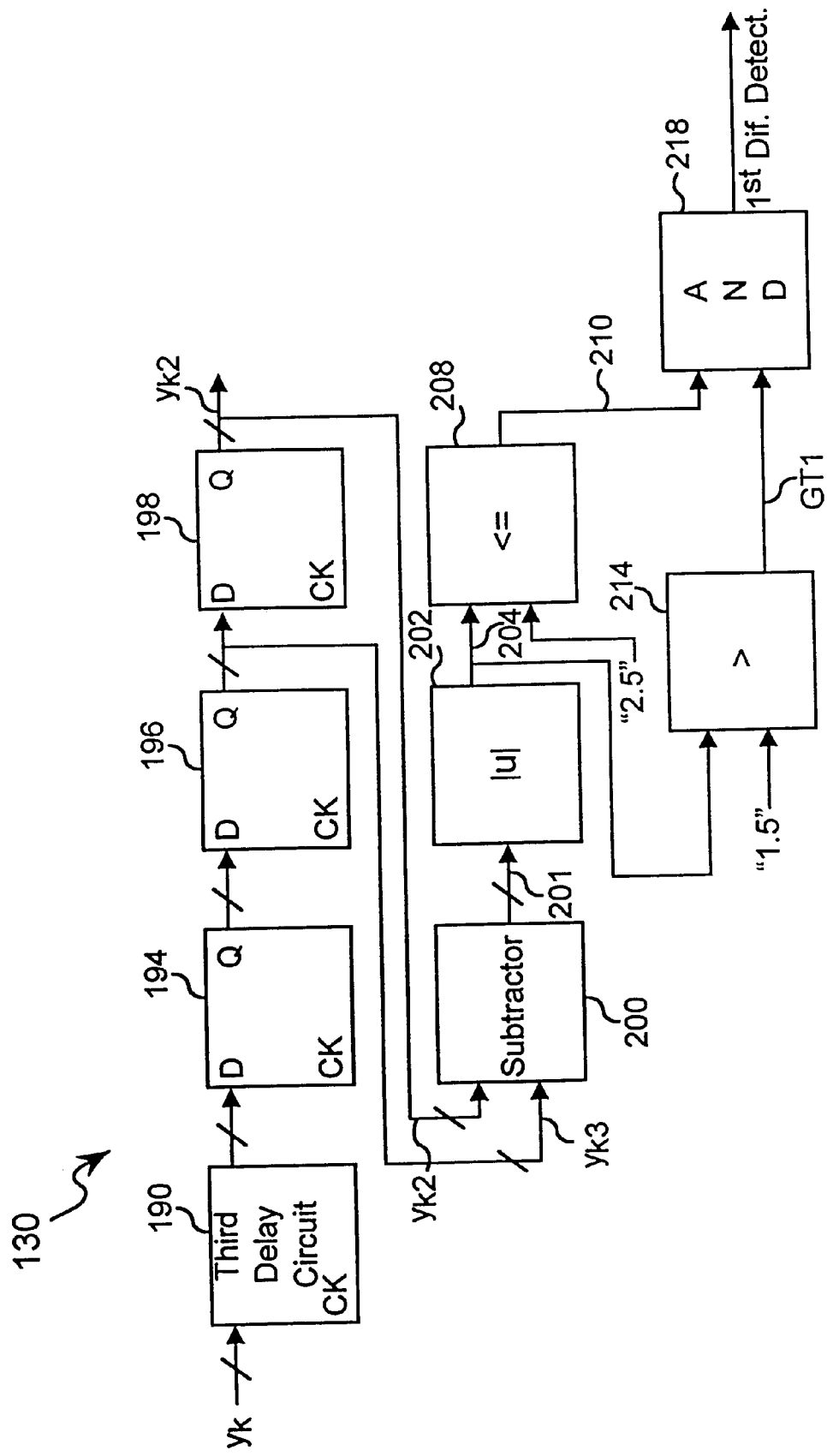
FIG. 9 illustrates an embodiment of the First Difference Comparator of FIG. 7.

FIG. 9 illustrates, in block diagram form, First Difference Comparator 130, which determines whether the $|y_{k3}-y_{k2}|$ term of the input difference sequence is approximately equal to the value associated with the dominant error event sequence; i.e. 2. First Difference Comparator 130 includes Third Delay Circuit 190, serially-coupled Latches 194, 196 & 198, Subtractor 200, Absolute Value Circuit 202, Less-Than-Equal Circuit 208, Greater-Than Circuit 214, and logical AND gate 218. Third Delay Circuit 190 receives as its input the multi-bit $y_k$ signal, which it delays and couples to Latch 194. Latches 194 & 196 further delay this signal to generate a representation of $y_{k3}$, which is coupled to Subtractor 200 and Latch 198. Latch 198 delays its input to generate as its output a signal representing $y_{k2}$. Subtractor 200 subtracts $y_{k3}$ from $y_{k2}$ to generate a First Difference signal on line 201. The First Difference signal is coupled to Absolute Value Circuit 202, which determines the absolute value of $y_{k3}-y_{k2}$ and represents it as the First Absolute Value signal on line 204. Less-Than-Equal Circuit 208 determines whether the value represented by the First Absolute Value signal is less than, or equal to 2.5. If so, Less-Than-Equal Circuit 204 asserts its output signal, LTE, on line 210. Greater-Than Circuit 214 operates simultaneous to Less-Than-Equal Circuit 208, determining whether the value represented by the First Absolute Value signal is greater than 1.5. If so, Greater-Than Circuit 214 asserts its output signal, GT1, on line 216. When both the LTE1 and GT1 signals are asserted logical AND gate 218 asserts its output signal, $1^{st}$ Dif Detect, indicating that the value of the $|y_{k3}-y_{k2}|$ term of the input difference sequence is within a range of values associated with the dominant error event.

B3. The Second Difference Comparator

Figure 10:
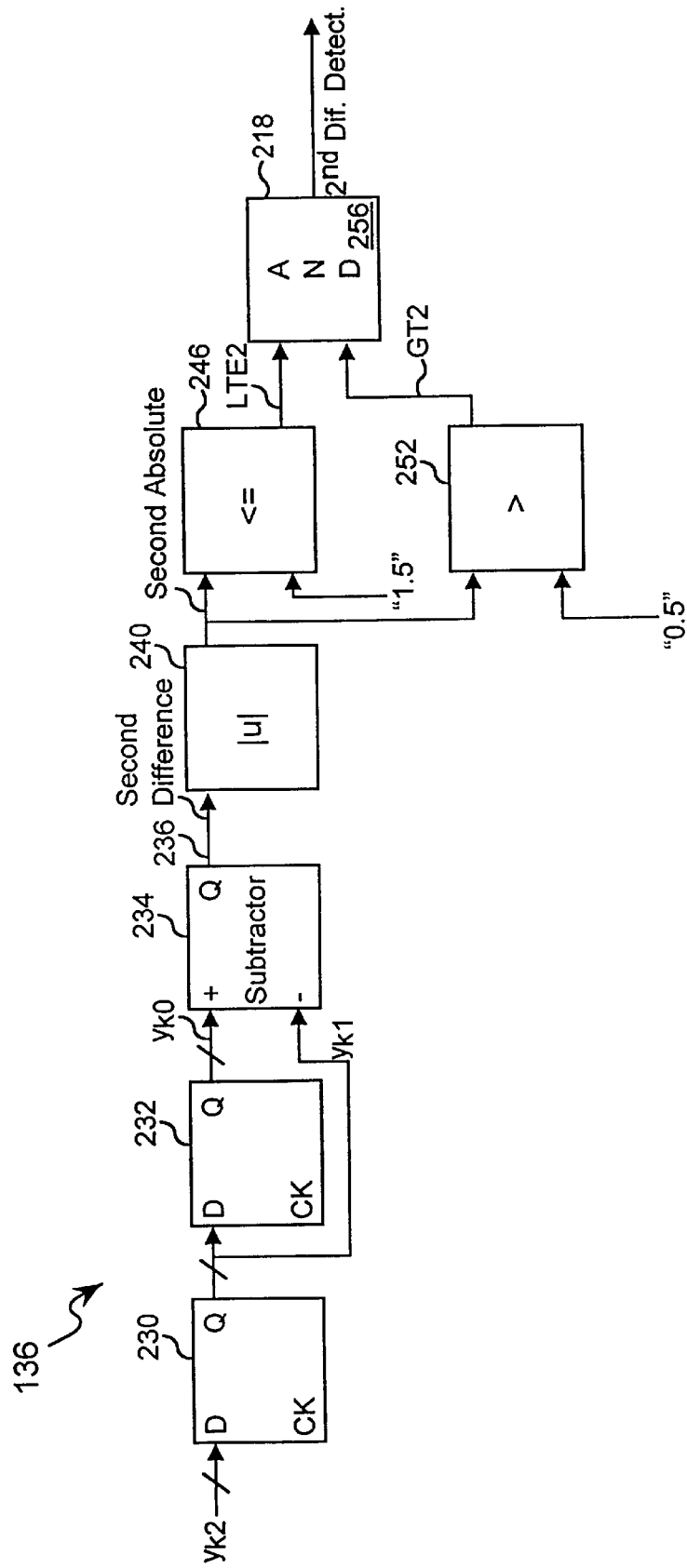
FIG. 10 illustrates an embodiment of the Second Difference Comparator of FIG. 7.

FIG. 10 illustrates, in block diagram form, Second Difference Comparator 136, which determines whether the $|y_{k1}-y_{k0}|$ term of the input difference sequence is approximately equal to the value associated with the dominant error event; i.e., 1. Second Difference Comparator 136 includes Latches 230 & 232, Subtractor 234, Absolute Value Circuit 240, Less-Than-Equal Circuit 246, Greater-Than Circuit 252 and logical AND gate 256. Latch 230 receives as its input the $y_{k2}$ signal from First Difference Comparator 130, which it further delays to generates its output, the $y_{k1}$ signal. Latch 230 couples the $y_{k1}$ signal to both Latch 232 and Subtractor 234. Latch 232 delays the $y_{k1}$ signal to generate the $y_{k0}$ signal, which it couples to Subtractor 234. Subtractor 234 subtracts $y_{k0}$ from $y_{k1}$ to generates the Second Difference signal, which it outputs on line 236. Absolute Value Circuit 240 generates the Second Absolute Value signal by taking the absolute value of the Second Difference signal. Less- Than-Equal Circuit 246 determines whether the Second Absolute Value is less than, or equal to, 1.5. If so, Less-Than-Equal Circuit 246 asserts its output, the LTE2 signal. Operating simultaneous to Less-Than-Equal Circuit 246, Greater-Than Circuit 252 determines whether the Second Absolute Value is greater than 0.5. If so, Greater-Than Circuit 252 asserts its output, the GT2 signal. When both the LTE2 and GT2 signals are asserted logical AND gate 256 asserts its output signal, 2nd Dif Detect, indicating that the value of the $|y_{k1}-y_{k0}|$ term of the input difference sequence is within a range of values associated with a dominant error event.

B4. The Error Correction Circuitry

Figure 11:
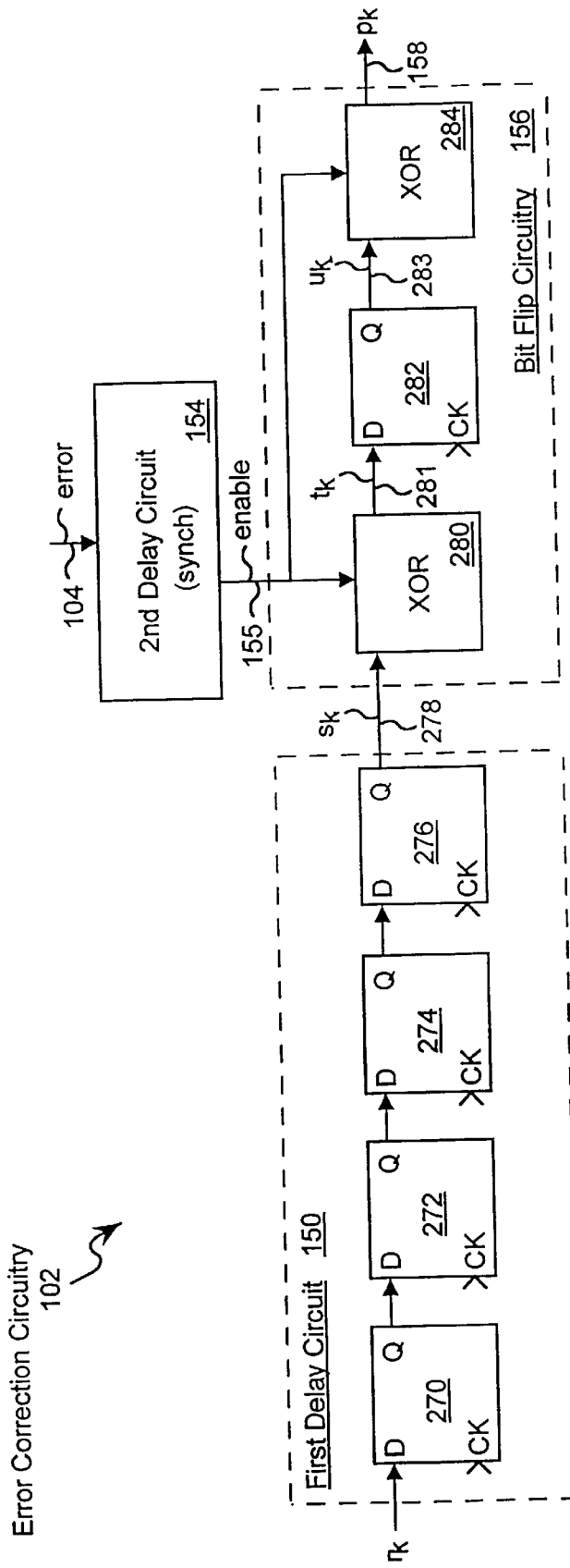
FIG. 11 illustrates an embodiment of the Error Correction Circuitry of FIG. 7.

FIG. 11 illustrates, in block diagram form, Error Correction Circuitry 102, which corrects the Viterbi Decoder output when a dominant error event is detected. In particular, when $[q_{k1}, q_{k0}]$ is erroneously detected as $[01_b]$ Error Correction Circuitry 102 forces $[q_{k1}, q_{k0}]$ to equal $[10_b]$ by flipping two bits. Error Correction Circuitry 102 includes First Delay Circuit 150, Second Delay Circuit 154 and Bit Flip Circuitry 156. First Delay Circuit 150 delays the $r_k$ signal to produce the $s_k$ signal on line 278 and Second Delay Circuit 154 delays the Error signal to produce the Enable signal on line 155. Bit Flip Circuitry 156 responds to assertion of the Enable signal by simultaneously flipping $q_{k1}$ while it is represented by the $s_k$ signal and $q_{k0}$ while it is represented by the $u_k$ signal on line 283.

First Delay Circuit 150 is realized as four serially coupled Latches 270, 272, 274 & 276 and outputs the $s_k$ signal on line 278. Second Delay Circuit 154 is also realized by five serially coupled latches (not illustrated) to produce the Enable signal on line 155. Bit Flip Circuitry 156 includes logical XOR gate 280, Latch 282 and logical XOR gate 284. Logical XOR gate 280 performs an exclusive OR operation on the $s_k$ and Enable signals to flip $q_{k1}$, producing its output signal $t_k$ on line 281, which is coupled to Latch 282. Latch 282 couples its output, the $u_k$ signal, on line 283 to logical XOR gate 284. Logical XOR gate performs an exclusive OR operation on the $u_k$ and Enable signals to produce the $p_k$ signal.

Figure 12:
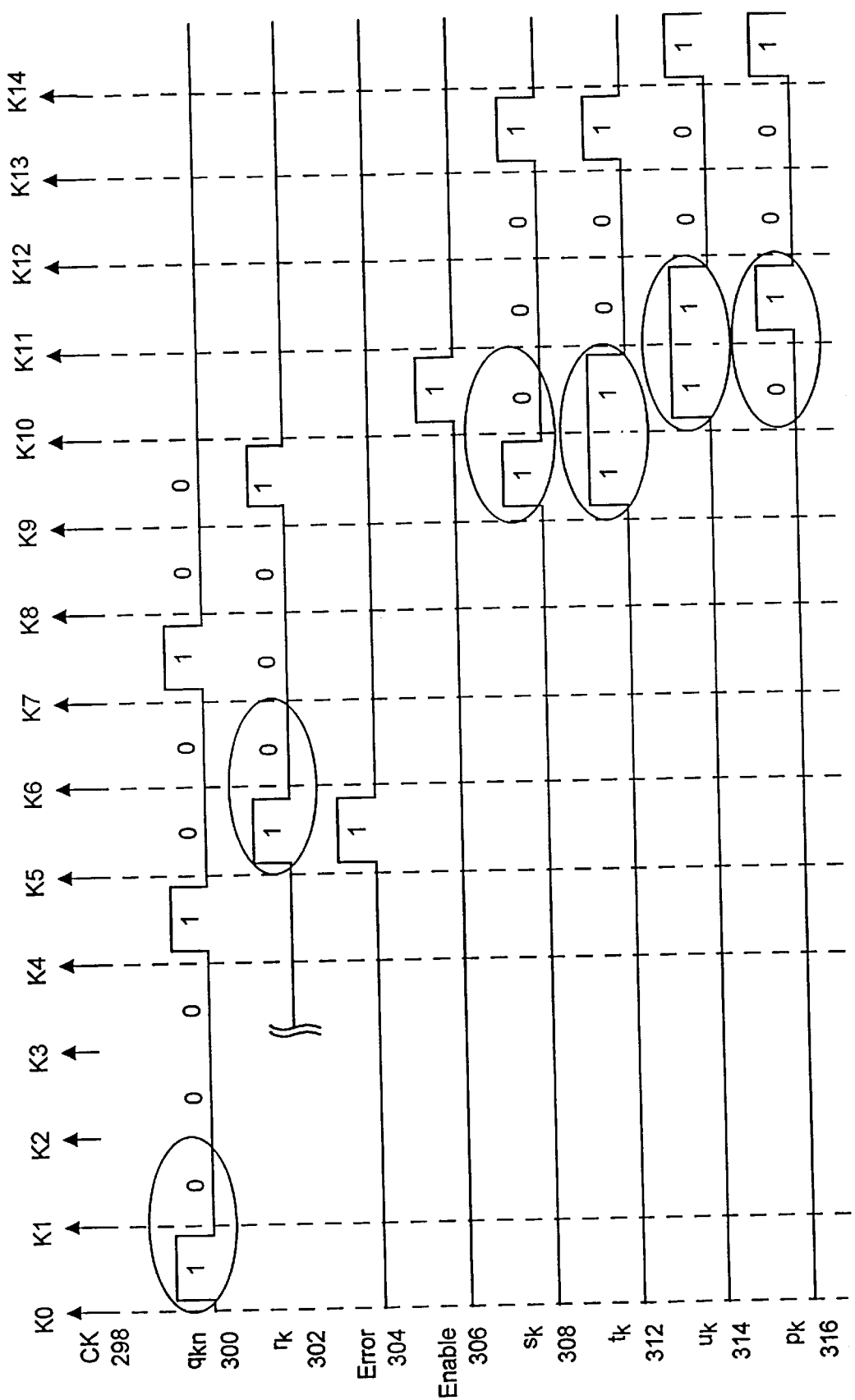
FIG. 12 illustrates the timing relationship between the various signals for the Error Correction Circuitry of FIG. 11.

FIG. 12 illustrates the timing relationship between the various signals relevant to Error Correction Circuitry 102. The transitions of the clock, CK signal 298, to which Error Correction Circuitry 102 responds are labeled "k0, k1, k2 . . . " etc, with lower numbered transitions occurring earlier than higher numbered transitions. In FIG. 12, the error in the $q_k$ signal 300 occurs at $q_{k0}$ and $q_{k1}$; however, this error is not recognized by Error Detect Circuitry 102 until $CK_{k5}$, at which time Error signal 304 is asserted. (The location of the representation of $q_{k0}$ and $q_{k1}$ in the signals of FIG. 12 is indicated by a circle.) At this point the $r_k$ signal represents $q_{k0}$. Thus, by the time an error is detected the erroneous bits, $q_{k0}$ and $q_{k1}$, are beginning to exit Output Sequence Detector 110. First and Second Delay Circuits 150 and 154 adjust the relative delay between the Enable signal 306 and the $s_k$ signal 308 so that Enable signal 306 is active while both $q_{k0}$ and $q_{k1}$ are represented by Bit Flip Circuitry 156. In response to the four clock cycle delay provided by First Delay Circuit 150, during $CK_{k9}$ the $s_k$ signal 308 represents $q_{k0}$ and during $CK_{k10}$ the $s_k$ signal 308 represents $q_{k1}$. Consequently, during $CK_{k10}$ Bit Flip Circuitry 156 represents both $q_{k0}$, via the $u_k$ signal 314, and $q_{k1}$, via the $t_k$ signal 312. Second Delay Circuit 154 delays the Error signal 304 by five clock cycles to bring the Enable signal 306 active at $CK_{k10}$.

During clock cycle $CK_{k9}$ the inputs to logical XOR gate 280 are $s_{k9}$, representing $q_{k0}$, and Enable signal 306, which is inactive. Logical XOR gate 280 responds to these inputs by bringing $t_{k9}$ to a voltage level representative of a logical 1. Latch 282 then latches $t_{k9}$. The next clock cycle, $CK_{k10}$, the inputs to logical XOR gate are $s_{k10}$, which now represents $q_{k1}$, and Enable signal 306, which is now active. At $c_{k10}$, logical XOR gate 280 outputs a voltage level representative of a logical 1, thereby flipping $q_{k1}$ as subsequently represented by the $t_k$ signal 312 and Bit Flip Circuitry 156. In response to $CK_{k10}$, Latch outputs $t_{k9}$ as $u_{k10}$. During $CK_{k10}$ Logical XOR gate 284 responds to the high levels of $u_{k10}$ and the Enable signal 306, by outputting a voltage level representative of a logical 0. This flips the subsequent representation of $q_{k0}$ from a logical 1 to a logical 0. Latch 282 responds to $CK_{k10}$ by latching in $t_{k10}$, which it outputs during $CK_{k11}$ as a representation of $q_{k1}$, via $u_{k11}$. Logical XOR gate responds to $u_{k11}$ and the inactive Enable signal 306 by outputting a logical high.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An apparatus to correct an error in a serial output signal generated by an optical Partial Response Maximum Likelihood (PRML) read channel processing a first set of input signals, the serial output signal representing a series of consecutive bits, the first set of input signals representing digitally a series of consecutive values, the apparatus comprising:

error detection circuitry receiving the serial output signal and the first set of input signals, the error detection circuitry asserting an error signal in response to a determination that the serial output signal matches a first bit sequence associated with the error, that a first difference in a first pair of consecutive values represented by the first set of input signals is within a first range of values and that a second difference in a second pair of consecutive values represented by the first set of input signals is within a second range of values; and error correction circuitry receiving the error signal and the serial output signal, the error correction circuitry responding to assertion of the error signal by modifying a pair of consecutive bits represented by the serial output signal to generate a corrected output signal having a second bit sequence.

2. The apparatus of claim 1 wherein the error detection circuitry identifies the first bit sequence as $10001_b$.

3. The apparatus of claim 2 wherein the error correction circuitry generates the second bit sequence of $01001_b$.

4. The apparatus of claim 1 wherein the error detection circuitry comprises:

an output sequence detector analyzing the serial output signal to determine whether it matches the first bit sequence associated with the error and, if so, asserting a sequence detect signal;

a first difference comparator analyzing the first set of input signals to determine whether the first difference between the first pair of consecutive values represented by the first pair of input signals is within the first range of values and, if so, asserting a first difference detect signal;

a second difference comparator analyzing the first set of input signals to determine whether the second difference between the second pair of consecutive values represented by the first pair of input signals is within the second range of values and, if so, asserting a second difference detect signal; and a first logical AND gate generating the error signal in response to the first difference detect signal, the second difference detect signal and the sequence detect signal.

5. The apparatus of claim 4 wherein the first difference comparator comprises:

a first delay circuit delaying the first set of input signals to generate a second set of input signals;

a first bank of latches receiving the second set of input signals and generating a third set of input signals, the third set of input signals representing one of the first pair of consecutive values represented by the first set of input signals;

a second bank of latches receiving the third set of input signals and generating the fourth set of input signals, the fourth set of input signals representing an other of the first pair of consecutive values represented by the first set of input signals; and a first sequence detector analyzing the third and fourth set of input signals to determine whether the first difference is within the first range of values and, if so, asserting the first difference detect signal.

6. The apparatus of claim 5 wherein the first range of values comprises values between 2.5 and 1.5.

7. The apparatus of claim 6 wherein the first sequence detector comprises:

a first subtractor circuit for subtracting the fourth set of input signals from the third set of input signals to generate a first set of difference signals;

a first absolute value circuit receiving the first set of difference signals and generating a first set of absolute value signals representing a first absolute value of the first difference;

a first comparator circuit analyzing the first set of absolute value signals to determine whether the first absolute value is less than 2.5 and, if so, asserting a first comparator output signal;

a second comparator circuit analyzing the first set of absolute value signals to determine whether the first absolute value is greater than 1.5 and, if so, asserting a second comparator output signal; and a second logical AND gate generating the first difference detect signal in response to the first and the second comparator output signals.

8. The apparatus of claim 4 wherein the second difference comparator comprises:

a third bank of latches receiving the first set of input signals and generating a fifth set of input signals, the fifth set of input signals representing one of the second pair of consecutive values represented by the first set of input signals;

a fourth bank of latches receiving the fifth set of input signals and generating the sixth set of input signals, the sixth set of input signals representing an other of the second pair of consecutive values represented by the first set of input signals; and a second sequence detector analyzing the fifth and sixth set of input signals to determine whether the second difference is within the second range of values and, if so, asserting the second difference detect signal.

9. The apparatus of claim 8 wherein the second range of values comprises values between 1.5 and 0.5.

10. The apparatus of claim 9 wherein the second sequence detector comprises:

a second subtractor circuit for subtracting the fifth set of input signals from the sixth set of input signals to generate a second set of difference signals;

a second absolute value circuit receiving the second set of difference signals and generating a second set of absolute value signals representing a second absolute value of the second difference;

a third comparator circuit analyzing the second set of absolute value signals to determine whether the second absolute value is less than 1.5 and, if so, asserting a third comparator output signal;

a fourth comparator circuit analyzing the second set of absolute value signals to determine whether the second absolute value is greater than 0.5 and, if so, asserting a fourth comparator output signal; and a third logical AND gate generating the second difference detect signal in response to the third and the fourth comparator output signals.

11. The apparatus of claim 4 wherein the output sequence detector comprises:

a first latch receiving the serial output signal and outputting a first delayed output signal;

a second latch receiving the first delayed output signal and outputting a second delayed output signal and a first complement signal, the first complement signal being a complement of the second delayed output signal;

a third latch receiving the second delayed signal and outputting a third delayed output signal and a second complement signal, the second complement signal being a complement of the third delayed output.signal;

a fourth latch receiving as an input the third delayed output signal and outputting a fourth delayed output signal and a third complement signal, the third complement signal being a complement of the third delayed output signal;

a fifth latch receiving as an input the fourth delayed output signal and outputting a fifth delayed uncorrected output signal; and a fourth logical AND gate receiving as inputs the first and fifth delayed output signals and the first, second and third complement signals, the fourth logical AND gate generating the sequence detect signal.

12. An apparatus for improved data detection in an optical Partial Recovery Maximum Likelihood (PRML) read channel, the apparatus comprising:

a Viterbi detector receiving a first set of digital input signals representing a series of consecutive data values, the Viterbi detector generating an output signal in response to the first set of digital input signals, the output signal representing a set of serial Non-Return to Zero Invert (NRZI) bits, baseline wandering of the first set of digital input signals causing an error to occur in the output signal;

an output sequence detector analyzing the output signal to determine whether it matches a first bit sequence associated with the error and, if so, asserting a sequence detect signal;

a first difference comparator analyzing the first set of digital input signals to determine whether a first difference between a first pair of consecutive data values represented by the first set of digital input signals is within a first range of values and, if so, asserting a first difference detect signal;

a second difference comparator analyzing the first set of input signals to determine whether a second difference between a second pair of consecutive data values represented by the first set of digital input signals is within a second range of values and, if so, asserting a second difference detect signal;

a first logical AND gate generating an error signal in response to the first difference detect signal, the second difference detect signal and the sequence detect signal; and error correction circuitry receiving the error signal and the output signal, the error correction circuitry responding to the error signal by modifying a pair of consecutive NRZI bits represented by the output signal to generate a corrected output signal having a second bit sequence different than the first bit sequence.

13. The apparatus of claim 12 wherein the output sequence detector identifies the first bit sequence of $10001_b$, and the error correction circuitry generates the second bit sequence of $01001_b$.

14. The apparatus of claim 13 wherein the first range of values comprises values between 2.5 and 1.5 and the second range of values comprises values between 1.5 and 0.5.

15. The apparatus of claim 14 wherein the first difference comparator comprises:

a first delay circuit delaying the first set of input signals to generate a second set of input signals;

a first bank of latches receiving the second set of input signals and generating a third set of input signals, the third set of input signals representing one of the first pair of consecutive values represented by the first set of input signals;

a second bank of latches receiving the third set of input signals and generating a fourth set of input signals, the fourth set of input signals representing an other of the first pair of consecutive values represented by the first set of input signals;

a first subtractor circuit for subtracting the third set of input signals from the fourth set of input signals to generate a first set of difference signals;

a first absolute value circuit receiving the first set of difference signals and generating a first set of absolute value signals representing a first absolute value of the first difference;

a first comparator circuit analyzing the first set of absolute value signals to determine whether the first absolute value is less than 2.5 and, if so, asserting a first comparator output signal;

a second comparator circuit analyzing the first set of absolute value signals to determine whether the first absolute value is greater than 1.5 and, if so, asserting a second comparator output signal; and a second logical AND gate generating the first difference detect signal in response to the first and the second comparator output signals.

16. The apparatus of claim 15 wherein the second difference comparator comprises:

a third bank of latches receiving the fourth set of input signals and generating a fifth set of input signals, the fifth set of input signals representing one of the second pair of consecutive values represented by the first set of input signals;

a fourth bank of latches receiving the fifth set of input signals and generating the sixth set of input signals, the sixth set of input signals representing an other of the second pair of consecutive values represented by the first set of input signals;

a second subtractor circuit for subtracting the fifth set of input signals from the sixth set of input signals to generate a second set of difference signals;

a second absolute value circuit receiving the second set of difference signals and generating a second set of absolute value signals representing a second absolute value of the second difference;

a third comparator circuit analyzing the second set of absolute value signals to determine whether the second absolute value is less than 1.5 and, if so, asserting a third comparator output signal;

a fourth comparator circuit analyzing the second set of absolute value signals to determine whether the second absolute value is greater than 0.5 and, if so, asserting a fourth comparator output signal; and a third logical AND gate generating the second difference detect signal in response to the third and the fourth comparator output signals.

17. The apparatus of claim 16 wherein the output sequence detector delays the output signal to generate a second output signal and wherein the error correction circuitry comprises:

a second delay circuit delaying the second output signal to generate a third output signal, the second delay circuit having a second delay;

a third delay circuit delaying the error signal to generate a delayed error signal, the third delay circuit having a third delay that is approximately equal to the second delay;

bit flip circuitry receiving the third output signal and the delayed error signal, the bit flip circuitry responding to assertion of the delayed error signal by flipping a final two consecutive NRZI bits of the series of consecutive NRZI bits represented by the third output signal to generate the corrected output signal.

* * * * *

UNITED STATES PATENT AND TRADEMARK OFFICE
CERTIFICATE OF CORRECTION

PATENT NO.    : 6,581,181 B1  Page 1 of 1
DATED         : July 17, 2003
INVENTOR(S)   : Gene Sonu It is certified that error appears in the above-identified patent and that said Letters Patent is hereby corrected as shown below:

<u>Title page, Item [54] and Column 1, line 1,</u>
After "DOMINANT ERROR", please insert -- EVENT --.

Signed and Sealed this

Twenty-first Day of October, 2003

JAMES E. ROGAN
*Director of the United States Patent and Trademark Office*